(12) United States Patent
Miller et al.

(10) Patent No.: US 10,138,921 B2
(45) Date of Patent: Nov. 27, 2018

(54) CONNECTING ELEMENT, USE AND METHOD

(71) Applicant: Arnold Unformtechnik GmbH & Co. KG, Forchtenberg-Ernsbach (DE)

(72) Inventors: Heiko Miller, Öhringen (DE); Dominik Fröhlich, Zweiflingen (DE)

(73) Assignee: Arnold Umformtechnik GmbH & Co. KG, Forchtenberg-Ernsbach (DE)

( * ) Notice: Subject to any disclaimer, the term of this patent is extended or adjusted under 35 U.S.C. 154(b) by 115 days.

(21) Appl. No.: 14/911,797

(22) PCT Filed: Jul. 11, 2014

(86) PCT No.: PCT/EP2014/064916
§ 371 (c)(1),
(2) Date: Feb. 12, 2016

(87) PCT Pub. No.: WO2015/022124
PCT Pub. Date: Feb. 19, 2015

(65) Prior Publication Data
US 2016/0195123 A1    Jul. 7, 2016

(30) Foreign Application Priority Data

Aug. 12, 2013 (DE) ........................ 10 2013 215 941

(51) Int. Cl.
| | |
|---|---|
| F16B 19/04 | (2006.01) |
| F16B 19/08 | (2006.01) |
| F16B 15/06 | (2006.01) |
| F16B 19/14 | (2006.01) |
| F16B 19/06 | (2006.01) |
| F16B 5/04 | (2006.01) |

(52) U.S. Cl.
CPC ............ F16B 19/083 (2013.01); F16B 15/06 (2013.01); F16B 19/14 (2013.01); F16B 5/04 (2013.01); F16B 19/06 (2013.01)

(58) Field of Classification Search
CPC .. F16B 15/06; F16B 19/06; F16B 5/04; F16B 37/061; F16B 11/006
USPC ........ 411/82–82.3, 171, 451.1, 455, 510, 307
See application file for complete search history.

(56) References Cited

U.S. PATENT DOCUMENTS 3,244,057 A * 4/1966 Mathison ................ F16B 15/06
411/392
3,473,433 A    10/1969 Mayr
(Continued)

FOREIGN PATENT DOCUMENTS

CN    2649850 Y    10/2004
DE    59438 A5    12/1967
(Continued)

*Primary Examiner* — Flemming Saether
(74) *Attorney, Agent, or Firm* — Boyle Fredrickson, S.C.

(57) ABSTRACT

A connecting element, the use thereof and a method for connecting plate shaped workpieces are proposed. The connecting element comprises a multiplicity of closed encircling annular projections, which are arranged in such a way that the spacing between adjacent annular projections changes along a circumference or that adjacent annular projections are arranged parallel to one another or obliquely to the longitudinal axis. The connecting element is rotated and pressed into contact to produce a hole and, after the production of the hole, is subjected only to axial contact pressure and is then twisted to lock.

17 Claims, 7 Drawing Sheets

(56) References Cited

U.S. PATENT DOCUMENTS

| | | | |
|---|---|---|---|
| 3,827,131 A | | 8/1974 | Coltrin |
| 3,867,864 A | | 2/1975 | Knohl |
| 4,313,697 A | * | 2/1982 | Rozanc ................. E21D 20/025 |
| | | | 405/259.6 |
| 4,388,791 A | * | 6/1983 | Anderson ............... E04C 5/167 |
| | | | 140/93 A |
| 4,395,174 A | | 7/1983 | Freeman |
| 4,836,729 A | * | 6/1989 | Bisping ................. F16B 13/146 |
| | | | 405/259.5 |
| 4,840,524 A | * | 6/1989 | Bisping ................. B60M 1/307 |
| | | | 174/138 D |
| 5,729,952 A | * | 3/1998 | Dahl ....................... E04C 5/165 |
| | | | 29/437 |
| 6,053,391 A | * | 4/2000 | Heideman ............ B23K 20/122 |
| | | | 228/112.1 |
| 6,640,414 B2 | * | 11/2003 | Stevenson .............. B21J 15/027 |
| | | | 228/112.1 |
| 6,892,924 B2 | * | 5/2005 | Stevenson .............. B21J 15/027 |
| | | | 228/112.1 |
| 2010/0183404 A1 | * | 7/2010 | Draht ....................... F16B 15/06 |
| | | | 411/455 |
| 2012/0308332 A1 | | 12/2012 | Jackson |
| 2012/0328391 A1 | * | 12/2012 | Levey ................... F16B 37/125 |
| | | | 411/337 |

FOREIGN PATENT DOCUMENTS

| | | |
|---|---|---|
| DE | 102010025389 A1 | 12/2011 |
| DE | 102011014870 A1 | 9/2012 |
| DE | 102011109815 A1 | 2/2013 |

\* cited by examiner

CONNECTING ELEMENT, USE AND METHOD

FIELD OF THE INVENTION

The invention relates to a connecting element for connecting at least two workpieces to one another without cutting, to the use of such a connecting element and to a method for connecting at least two workpieces with the aid of a connecting element.

BACKGROUND

A connecting element for connecting two workpieces without cutting is already known. The connecting element comprises a shank having a multiplicity of parallel annular projections, which form grooves between them and which lie in a plane extending perpendicularly to the longitudinal axis of the connecting element. The connecting element is driven through the components by means of pressure and rotation, giving rise to a connection by friction welding (DE 10 2011 014 870 A1).

A connecting element for connecting two workpieces, which has a multiplicity of encircling annular projections with a constant, spacing on a shank is furthermore known, said annular projections extending obliquely to the longitudinal axis and parallel to one another DE 10 2011 109 815 A1). This connecting element is driven in with the application of pressure and rotation in order to produce a firm connection by means of frictional heating and local deformation of the component materials.

SUMMARY

It is the underlying object of the invention to provide a connecting element which can be installed easily and ensures high standards as regards reliability of connection.

To achieve this object, the invention proposes a connecting element having the features described herein, the use of said connecting element to connect two workpieces and a method. Developments of the invention form the subject matter of the respective dependent patent claims.

Thus, the connecting element comprises a shank having a connecting element head with a rotary driving formation at one end thereof. The shank has another, front end. The shank comprises at least one pair of encircling annular projections, preferably a plurality of such pairs. At least one annular projection of such a pair does not lie in a transverse plane of the shank arranged perpendicularly to the longitudinal axis of the shank. The spacing between two adjacent annular projections forming a pair is not constant along the circumference of the shank but differs in size, or both annular projections of a pair are arranged parallel to one another.

In particular, it is possible, as a development of the invention, to envisage that the annular projections of a pair are arranged or formed in such a way that the spacing between them increases or decreases continuously over an angle of 90°. After the connecting element head hag come into contact with the outer workpiece, the connecting element can then be twisted through 90° in order to lock the connecting element.

It is likewise possible and is proposed by the invention that the annular projections are arranged in such a way that the spacing between them increases or decreases continuously over an angle of 180°. In this case, twisting through 180° can be used to lock the connecting element.

Other types of design for the annular projections are likewise possible.

For example, the connecting element can be used to connect a plurality of workpieces which already have an opening in the form of a hole, the connecting element thus being driven into the holes, which are arranged congruently. For such a case, it may be sufficient for the front end of the shank of the connecting element to be of blunt design, if appropriate with a slight chamfer on the front end.

However, the connecting element can also be used to connect a plurality of workpieces of which the lower workpiece is unperforated, if appropriate also where both workpieces are unperforated. For such a case, provision can be made, according to the invention, for the front end of the shank to have a tip, which is slightly rounded if appropriate, in particular a ballistic tip. Thus, the connecting element then also serves to produce a hole by means of a forward movement, said hole being provided, in particular, with a rim.

According to another feature of the invention, provision can be made for a sizing zone to adjoin the front end of the shank, said sizing zone being used to give the hole a correct shape and size.

As a further development of the invention, the shank can have an application zone, which can be arranged behind the sizing zone, for example. The task of this application zone is to perform alignment of the connecting element relative to the workpiece if appropriate in order to ensure that the connecting element is aligned exactly perpendicular to the surface of the workpiece.

As a development of the invention, encircling ribs can be present within the application zone, all of said ribs lying in a plane extending perpendicularly to the longitudinal axis of the connecting element. Where present, an interspace between said projections can have the same size throughout. The projections within the application zone are normally positioned in such a way between the two workpieces, when a connection has been brought about, that they no longer contribute to the connection itself.

The shank of the connecting element can have a circular cross section, as can the outer circumference of the annular projections.

However, it is likewise possible and is proposed by the invention that the shank cross section is of rounded polygonal, in particular trilobular, design.

It is likewise possible for the shank cross section to be of circular design in one region and of rounded polygonal design in another region.

In particular, provision can be made for the shank cross section to be of circular design in the holding portion and of polygonal design in the region of the front shank end.

Provision can be made for the shank to be of cylindrical design, especially when the connecting element is provided for connecting perforated workpieces.

It is likewise possible for the shank to be of conical design.

A combination of both shapes in such a way that the holding portion is cylindrical and the region between the front shank end and the holding portion is conical is likewise proposed by the invention.

According to another feature of the invention, provision can be made for at least one annular projection of the pair of annular projections to lie in a plane extending perpendicularly to the longitudinal axis of the connecting element.

As a further development of the invention, provision can be made for at least one annular projection to lie in a plane extending obliquely to the longitudinal axis of the connecting element.

It can likewise be envisaged, and is proposed by the invention, that at least one annular projection is of undulating design.

In yet another development of the invention, at least one annular projection can have two or wore parts offset in a step-like manner, which, if appropriate, lie in a plane extending perpendicularly to the longitudinal axis of the fastening element.

In the case of the profile of an annular projection, provision can be made for the annular projection to be of rounded design, at least in the holding portion.

Another possibility proposed by the invention consists in that the flank profile of at least one annular projection in the holding portion is of symmetrical design.

However, it is also possible for the flank profile of at least one annular projection in the holding portion to be of asymmetrical design, wherein the shallower flank is oriented in the direction of the front end of the screw in order to make it easier to drive in the connecting element.

Another possibility consists in that, in the case of an asymmetrical flank profile, the flank facing the connecting element head extends almost perpendicularly to the longitudinal axis of the connecting element.

The various embodiments of the flank profile in the holding portion can also be provided in the sizing zone and/or the application zone.

The invention likewise proposes the use of a connecting element of the kind described herein for connecting at least two workpieces to one another, wherein the connecting element is pressed in by means of axial pressure until the underside of the connecting element head rests on the upper workpiece, and is then twisted through an angle of less than 360°.

The invention likewise proposes a method for connecting a plurality of workpieces, in which the workpieces are placed one on top of the other and a connecting element as described herein is driven through the workpieces until the underside of the connecting element head rests on the upper of the two workpieces. The connecting element is then twisted through an angle of, for example, less than 360° to lock.

If the workpiece on which the second workpiece is to be secured is already perforated in the connecting region, it may be sufficient, according to the invention, if the connecting element is pushed forward exclusively axially under the action of an axial force until the underside of the connecting element head rests on the workpiece to be secured. Twisting to produce locking is then subsequently performed.

If, in contrast, the workpiece is not perforated in the connecting region or is provided with a hole which is too small, it is possible, according to the invention, for the connecting element to be rotated at high speed under the action of a high axial force in order in this way to plasticize the material to be penetrated by the introduction of heat. In this way, a hole with a rim is formed. As soon as this hole has been formed, the speed is reduced, if appropriate to 0. The press-in process is then performed again under the action of a high force, followed by twisting to lock.

As a development, the application zone can be used to press in the connecting element smoothly and in a centered manner.

BRIEF DESCRIPTION OF THE DRAWINGS

Further features, details and advantages of the invention will emerge from the claims and the abstract, the wording of both of which is incorporated by reference into the description, from the following description of preferred embodiments of the invention and from the drawings. Individual features of the various embodiments can be combined in any desired manner without exceeding the scope of the invention. In the drawings:

DETAILED DESCRIPTION

Figure 1:
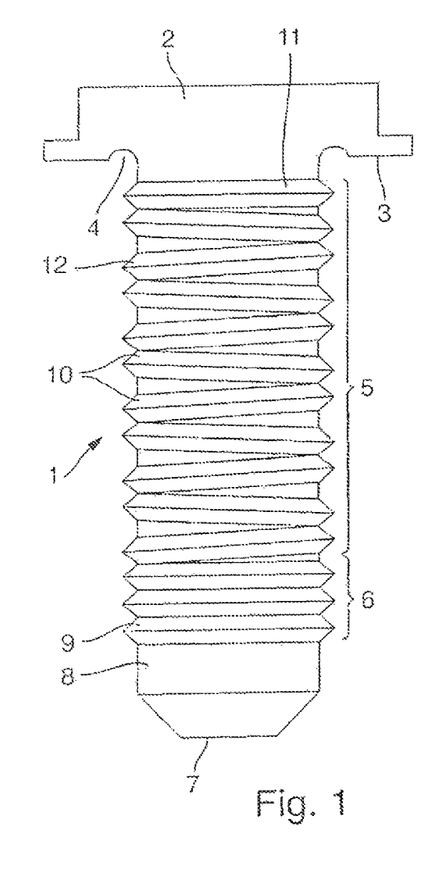
FIG. 1 shows the partially sectioned side view of a connecting element according to the invention.

FIG. 1 shows a partially sectioned side view of a connecting element according to the invention. The connecting element comprises a shank 1, at one end of which a connecting element head 2 is arranged. The head 2 projects radially beyond the outside of the shank 1, with the result that it forms an underside 3. This underside 3 is intended to rest on the workpiece to be secured. Directly at the shank 1, the underside 3 comprises a fillet 4, into which material displaced upward during production of the connection can penetrate. The connecting element head 2 comprises a rotary driving formation (not shown), e.g. in the form of an external hexagon or some other driving formation. The design of the head 4 is substantially arbitrary and can also be lens-shaped, for example. The shank 1 comprises a holding portion 5 adjoining the underside 3 of the head 4, and an application zone 6 adjoining said holding zone 5. A sizing zone 8 is formed between the application zone 6 and the front, blunt end 7 of the shank, the shank having a constant diameter in said sizing zone. The sizing zone can be present but does not necessarily have to be present. The region between, the sizing zone 8 and the end 7 of the shank is of frustoconical design.

The connecting element illustrated in FIG. 1 is intended for connecting at least two sheets or workpieces, of which at least the lower sheet already has a hole, into which the connecting element can engage.

In the application zone 6, this shank 1 has a total of three encircling, closed annular projections 9, which rest directly on one another and which form a symmetrical flank profile. These annular projections 9 are each situated in a plane which extends perpendicularly to the longitudinal axis of the connecting element. In general, it is possible to provide two or more annular projections, and these can also form an asymmetrical flank profile.

In the holding portion 5, which extends from the application zone 6 as far as the underside s of the connecting element head 2, the shank comprises a multiplicity of annular projections 10 with the same flank profile as the annular projections 9. However, all of the annular projections 10 with the exception of the last annular projection 11 each lie in a plane which extends obliquely to the longitudinal axis of the shank 1. The angle at which the annular projections are arranged obliquely to the longitudinal axis is about 87° or 93° and can typically lie in a range between −70° and 100°. As a result, an interspace is formed, between each 2 adjacent annular projections 10, wherein the spacing between the edges 12 of the annular projections 10 along a circumference initially increases continuously over an angle of 180° and then decreases continuously over an angle of likewise 180°. The last annular projection 11 can likewise be arranged obliquely, like the annular projections 10.

Figure 2:
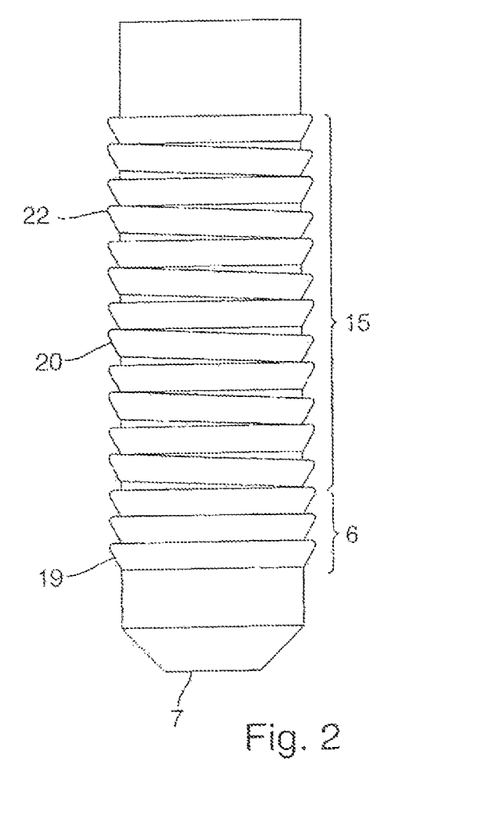
FIG. 2 shows the shank of a connecting element of a second embodiment.

FIG. 2 shows an illustration corresponding to FIG. 1 of a second embodiment, in which the connecting element head 2 has been omitted for simplicity of illustration. Once again, a total of three annular projections 19 is provided in the application zone 6, said projections resting on one another without an interspace and extending perpendicularly to the longitudinal axis, wherein, here too, it is also possible for two or more annular projections to be provided. The annular projections 19 have an asymmetrical flank profile, wherein the shallower flank is oriented in the direction of the front, blunt end 7 of the shank 1, while the steeper flank is oriented in the direction of the connecting element head 2 (not shown). The steeper flank extends perpendicularly to the longitudinal axis.

In the holding portion 15, the annular projections 20 are oriented in the same way as the annular projections 10 in the embodiment in FIG. 1, with the result that the spacing between the edges 22 thereof changes in the same way as in the embodiment in FIG. 1. Here too, the obliquely extending annular projections 20 in the holding portion 15 have the some flank profile as the annular projections 9 in the application zone 6.

Figure 3:
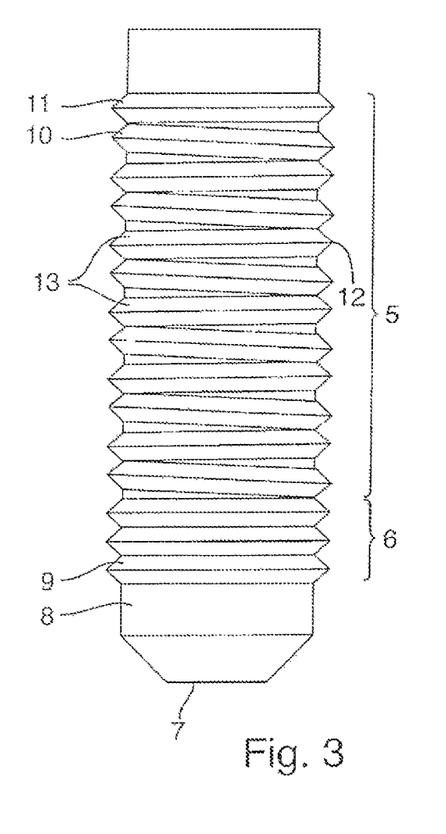
FIG. 3 shows an illustration corresponding to FIG. 2 of a connecting element of a third embodiment.

FIG. 3 shows a third embodiment, in which the connecting element head 2 has been omitted, likewise for simplicity of illustration. The sizing zone 8 and the application zone 6 are identical to those in the embodiment in FIG. 1. In the holding portion 5 there are obliquely extending annular projections 10, as in the embodiment in FIG. 1, and there are then annular projections 13, each arranged in a plane extending perpendicularly to the longitudinal axis, between each two obliquely extending annular projections 10. Here too, the spacing between the edges 12 of each two adjacent annular projections 10, 13 is such that it increases in the circumferential direction over a range of 180° and then decreases again over an identical range of 180°.

Figure 4:
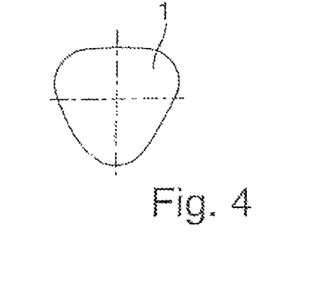
FIG. 4 shows the cross section through the shank of a connecting element.

FIG. 4 shows a possible cross section through the shank 1 of a connecting element according to the invention. The cross section can have the shape of a triangle with rounded corners and rounded sides, a shape which is also referred to as trilobular. This is shown in FIG. 4.

Figure 5:
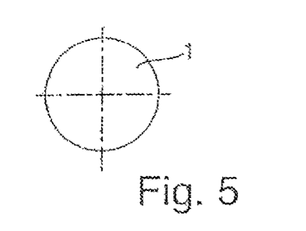
FIG. 5 shows the cross section through the shank of a connecting element.

The cross section can also have the shape of a circle, as illustrated in FIG. 5.

Figure 6:
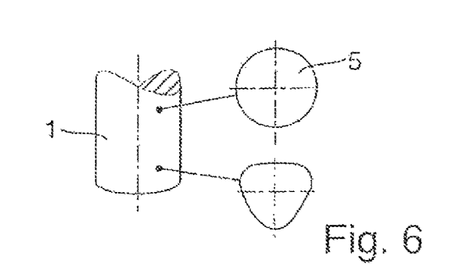
FIG. 6 shows schematically the cross sections through a connecting element at two different points.

FIG. 6 shows one possibility for the design of a shank 1, which namely has a circular cross section in the holding portion 5 situated closer to the connecting element head 2 and, in the region arranged closer to the tip, e.g. the sizing zone 8, has a rounded polygonal cross section corresponding to FIG. 4.

Figure 7:
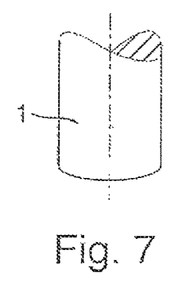
FIG. 7 shows a detail of a cylindrical shank.
Figure 8:
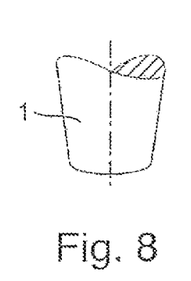
FIG. 8 shows a detail of a conical shank.
Figure 9:
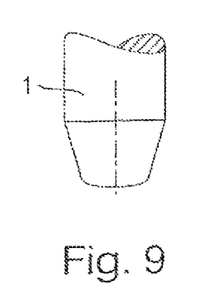
FIG. 9 shows the illustration of a shank which has a cylindrical and a conical portion.

While FIGS. 4 to 6 are concerned with the cross section of the shank 1, FIGS. 7 to 9 show various possibilities for the design of the shank in the longitudinal direction. FIG. 7 is intended to indicate that the shank is of cylindrical design overall, while FIG. 8 is intended to indicate that the shank has the shape of a truncated cone.

FIG. 9 then shows a shank which is of cylindrical design over a relatively large part, e.g. in the holding portion 5 and the application zone 6, while it is conical in the front region situated closer to the tip.

The following figures are then concerned with the individual annular projections, wherein initially only individual annular projections are shown here, whereas the shank always comprises the annular projections in pairs, preferably in a plurality of pairs.

Figure 10:
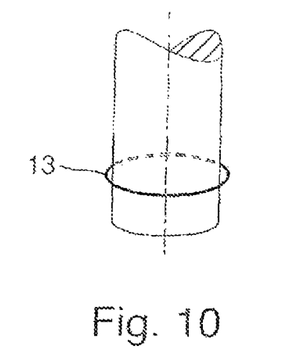
FIG. 10 shows schematically a single annular projection.
Figure 11:
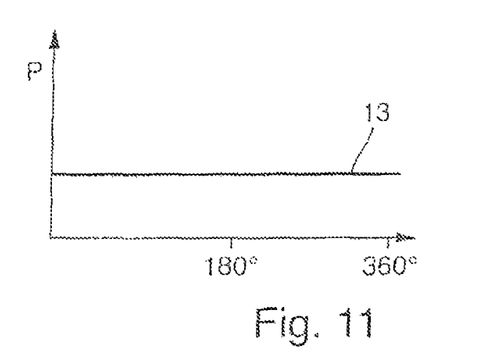
FIG. 11 shows the development of the annular projection in FIG. 10.

FIG. 10 shows a schematic illustration of a shank with a single annular projection 13, i.e. an annular projection which lies in a plane extending perpendicularly to the longitudinal axis of the shank, see FIG. 3. FIG. 11 shows the development of an annular projection of this kind, wherein the abscissa represents the circumference of the shank in angular degrees and the ordinate represents the distance between the annular projection and the shank end.

Figure 12:
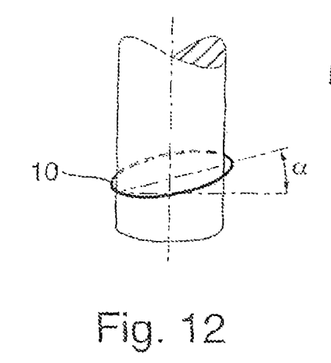
FIG. 12 shows the illustration of a second annular projection.
Figure 13:
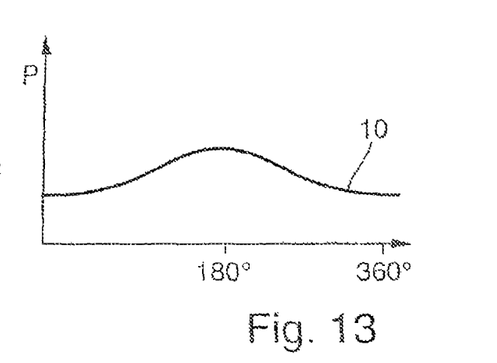
FIG. 13 shows the development of the annular projection in FIG. 11.

In a corresponding way, FIG. 12 shows a shank 1 with an annular projection 10 of the kind illustrated in FIG. 1 and FIG. 3. This annular projection 10 extends in a plane which extends obliquely at the indicated angle 2. The angle 2 can typically be in a range between 2° and 10°. The development in FIG. 13 shows an undulating profile.

Figure 14:
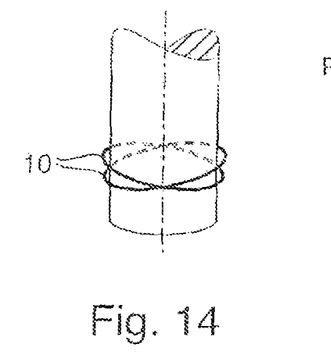
FIG. 14 shows two annular projections of the type illustrated in FIG. 12.
Figure 15:
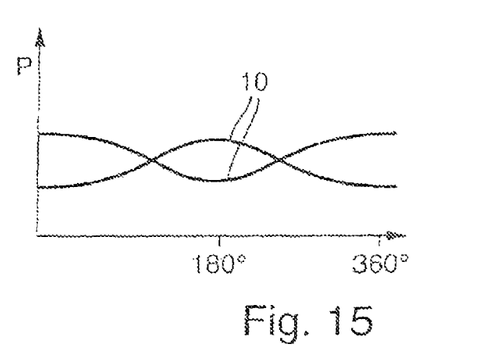
FIG. 15 shows the development of the annular projections in FIG. 14.

FIG. 14 shows another way of arranging annular projections, wherein in this case the two annular projections 10 intersect. The same applies to the development of the two annular projections in FIG. 15.

Figure 16:
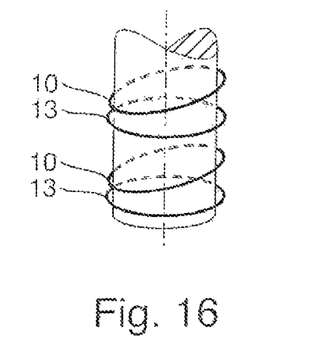
FIG. 16 shows two pairs of annular projections.

In FIG. 16, two pairs of annular projections 10, 13 are depicted on the shank, of which annular projections 10 extend obliquely while annular projections 13 extend in a plane transverse to the longitudinal axis. At all points, the two annular projections 10, 13 forming a pair have a spacing which changes continuously over an angle of 360°, more specifically increasing up to 180° and then decreasing again.

Figure 17:
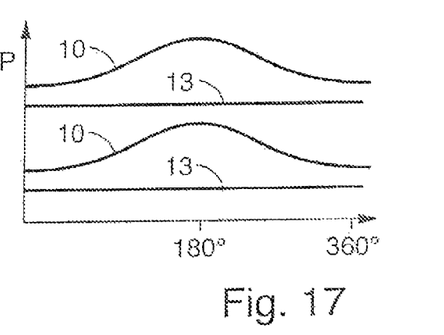
FIG. 17 shows the development of the annular projections in FIG. 16.
Figure 18:
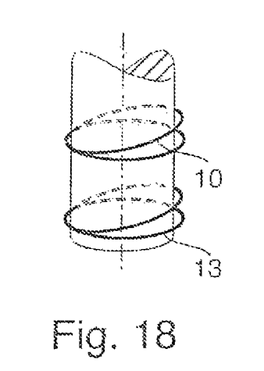
FIG. 18 shows two further pairs of annular projections.
Figure 19:
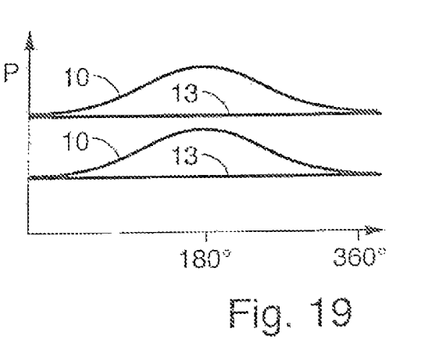
FIG. 19 shows the development of the annular projections in FIG. 18.

The embodiment in FIGS. 18 and 19 differs from that in FIGS. 16 and 17 only in that the two annular projections 10, 13 of each pair of annular projections touch at one point, with the result that their mutual spacing at this point is 0.

Figure 20:
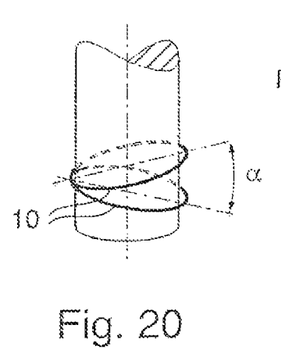
FIG. 20 shows a pair of annular projections.
Figure 21:
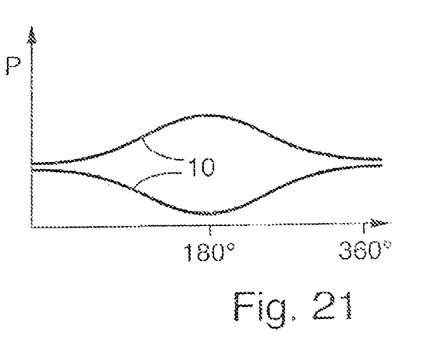
FIG. 21 shows the development of the annular projections in FIG. 20.

The embodiment in FIGS. 20 and 21 corresponds approximately to FIG. 1 since, in this case, both annular projections 10 extend obliquely to the longitudinal axis.

Figure 22:
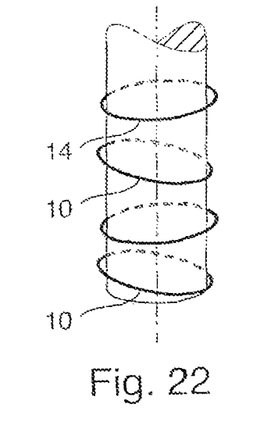
FIG. 22 shows two pairs of annular projections.
Figure 23:
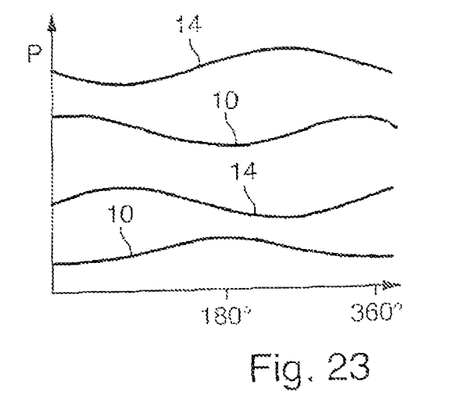
FIG. 23 shows the development of the annular projections in FIG. 22.

In the embodiment in FIGS. 22 and 23, a plurality of annular projections are combined with one another, namely annular projections 10, 14 extending obliquely in a plane, which are each offset by 90° on the circumference. This also results in a change is the spacing between the edges 12 of adjacent annular projections over the circumference of the shank. The number and angular degree of the offset can vary. The more annular projections 10, 14 are present, the larger is the offset.

Figure 24:
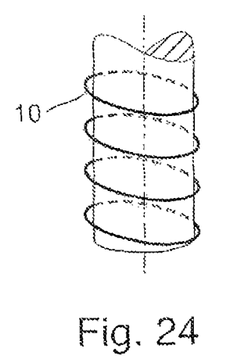
FIG. 24 shows two pairs of annular projections.
Figure 25:
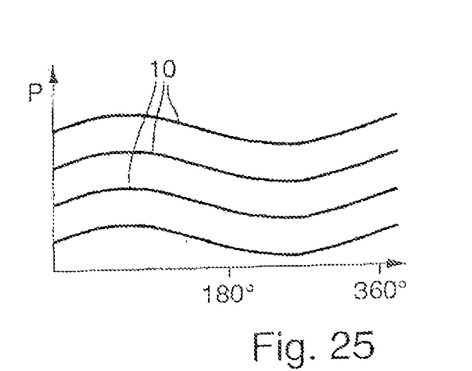
FIG. 25 shows the development of the annular projections in FIG. 24.

In the embodiment in FIGS. 24 and 25, all the annular projections 10 extend obliquely and parallel to one another.

Figure 26:
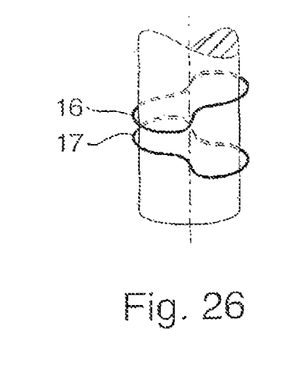
FIG. 26 shows a pair of annular projections with a stepped offset.
Figure 27:
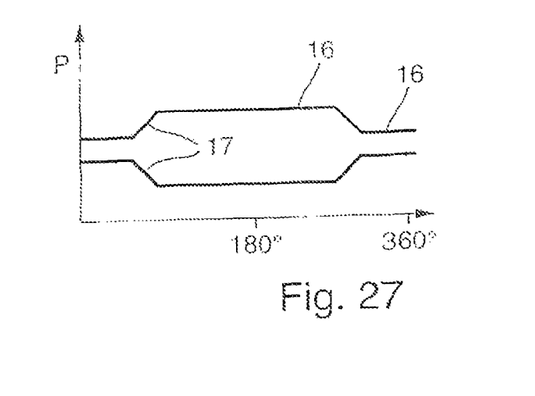
FIG. 27 shows the development of the annular projections in FIG. 26.

FIGS. 26 and 27 show schematically an embodiment in which two annular projections 16 are present, each having two parts separated by a step 17, said parts, for their part, once again lying in a transverse plane. By this means too, it is ensured that the spacing between the edges 12 of adjacent annular projections changes along a circumference.

Figure 28A:
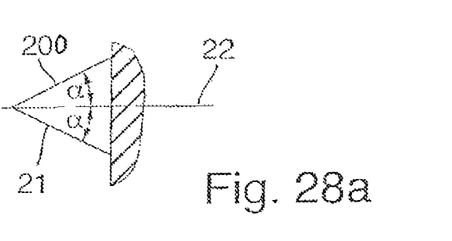
FIG. 28a to FIG. 28d show a total of four profiles of annular projections.

It has already been pointed out when comparing FIGS. 1 and 2 that the annular projections can have different flank profiles. This is illustrated once again by means of FIGS. 28a to 28d. FIG. 28a shows an annular projection in cross section, said annular projection forming a symmetrical triangle. One flank 200 faces in the direction of the connecting element head 2, and the other flank 21 of the annular projection faces in the direction of the front end 7 of the shank. Both flanks 20, 21 extend at the same angle to the indicated transverse plane 22, i.e. a plane which extends perpendicularly to the longitudinal axis of the connecting element.

Figure 28B:
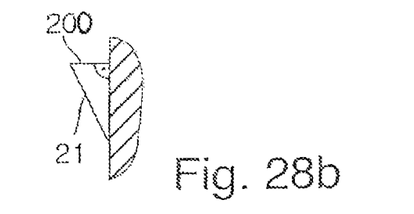

FIG. 28b likewise shows a cross section through an annular projection, which forms a triangle that, in this case, is asymmetrical. Here, the flank 200 facing in the direction of the connecting element head extends perpendicularly to the longitudinal axis, while the opposite flank 21 forms an acute angle with the longitudinal axis. This shape of the cross section facilitates penetration of the connecting element into a workpiece.

Figure 28C:
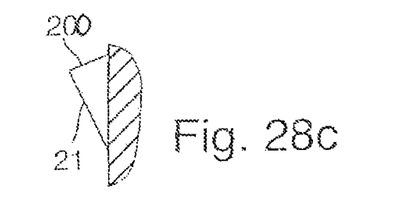

FIG. 28c shows a similar cross section, wherein in this case the flank 200 facing the head 2 likewise extends obliquely.

Figure 28D:
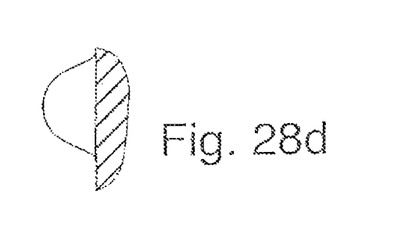

The last partial figure, FIG. 28d, shows a cross section through an annular projection which is of rounded design and has as almost semicircular shape. Here too, the cross-sectional shape can be asymmetrical.

The embodiments according to FIGS. 1 to 3 each show a connecting element which is intended for connecting two workpieces which are both perforated or of which at least one is perforated. Therefore, the connecting element does not need to form a hole, and at most has only to resize an existing hole by means of a sizing zone 8.

Figure 29:
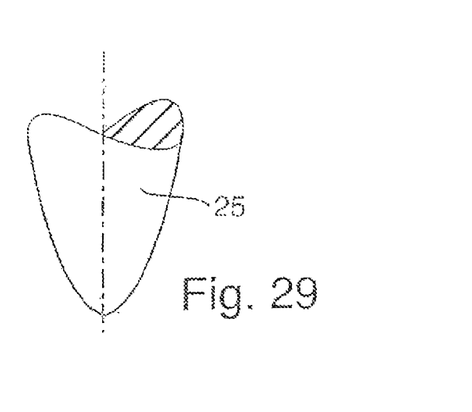
FIG. 29 shows schematically a tip of a connecting element according to the invention.

If a connecting element is supposed to connect workpieces of which the lower workpiece is unperforated or both workpieces are unperforated, the front shank end must be modified accordingly. A front shank end of this kind with a ballistic tip 25 is illustrated in FIG. 29.

Figure 30:
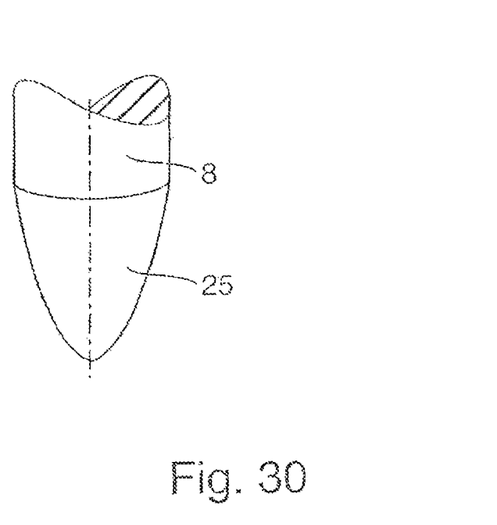
FIG. 30 shows an illustration corresponding to FIG. 29 of the tip of a connecting element having a sizing zone.

In the case of a ballistic tip 25 too, which serves to produce the hole by flow hole forming, a sizing zone 8 can be provided, said zone being positioned between the ballistic tip 25 and the application zone 6.

Figure 31:
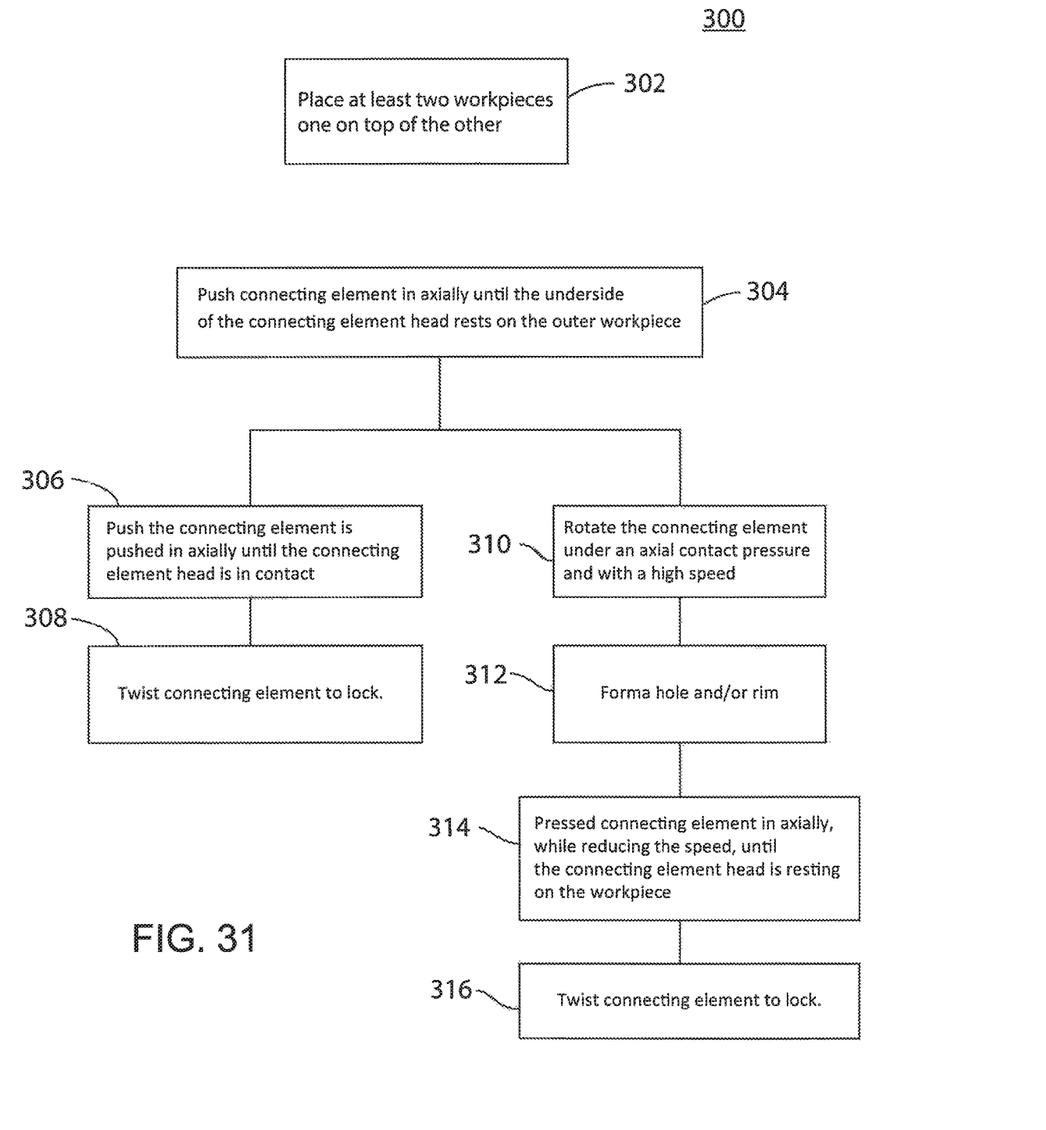
FIG. 31 shows a flowchart illustrating a method for connecting at least two workpieces to one another.

FIG. 31 shows a flowchart 300 illustrating a method for connecting at least two workpieces to one another, in which the workpieces are placed one on top of the other in a step 302. To secure the workpieces, a connecting element as described herein is pushed in axially until the underside of the connecting element head rests on the outer workpiece in a step 304, after which the fastening element is twisted to lock. For connection to a workpiece perforated in the connecting region, the connecting element is pushed in axially until the connecting element head is in contact in a step 306 and is then twisted to lock in a step 308. For connection to a workpiece unperforated in the connecting region, the connecting element is rotated under an axial contact pressure and with a high speed in a step 310 until a hole and, if appropriate, a rim is produced in a step 312 and is then pressed in axially, while reducing the speed, until the connecting element head is resting on the workpiece in a step 314, and is then twisted to lock in a step 316.

The invention claimed is:

1. A connecting element for connecting at least two workpieces to one another, having
   a shank,
   a connecting element head at one end of the shank, said head projecting radially beyond the outside of the shank,
   a rotary driving formation on the connecting element head, and
   a front shank end, wherein
   at least one pair of closed annular projections is arranged on the shank in a holding portion of the shank which starts from the underside of the connecting element head, wherein
   at least one annular projection is not arranged fully in a plane extending perpendicularly to the longitudinal axis of the shank, and
   the spacing between the two annular projections of the pair differs along the circumference,
   wherein the front end of the shank is of blunt design.

2. The connecting element as claimed in claim 1, in which a sizing zone adjoins the front end of the shank.

3. The connecting element as claimed in claim 1, in which the shank has an application zone.

4. The connecting element as claimed in claim 1, in which the shank cross section is of circular and/or polygonal design, wherein the holding portion has the circular cross section in the case of a combination of a circular and a polygonal cross section.

5. The connecting element as claimed in claim 1, in which the shank is of cylindrical and/or conical design, wherein the holding portion is cylindrical in the case of a combination of a cylindrical and a conical profile.

6. The connecting element as claimed in claim 1, in which at least one annular projection lies in a plane extending perpendicularly to the longitudinal axis of the connecting element.

7. The connecting element as claimed in claim 1, in which at least one annular projection lies in a plane extending obliquely to the longitudinal axis of the connecting element.

8. The connecting element as claimed in claim 1, in which at least one annular projection is of undulating design.

9. The connecting element as claimed in claim 1, in which at least one annular projection has two parts offset in a step-like manner, which each lie in a plane extending perpendicularly to the longitudinal axis of the fastening element.

10. The connecting element as claimed in claim 1, in which the flank profile of at least one annular projection in the holding portion is of symmetrical design.

11. The connecting element as claimed in claim 1, in which the flank profile of at least one annular projection in the holding portion is of asymmetrical design, wherein the flank facing the connecting element head-is preferably closer to a plane transverse to the longitudinal axis of the connecting element.

12. The connecting element as claimed in claim 1, in which the flank profile of at least one annular projection in the holding portion has a rounded cross section.

13. The use of a connecting element as claimed in claim 1 for connecting at least two workpieces to one another by pushing the connecting element in axially until the underside of the connecting element head is in contact and then twisting to lock.

14. A method for connecting at least two workpieces to one another, in which the workpieces are placed one on top of the other and a connecting element as claimed in claim 1 is pushed in axially until the underside of the connecting element head rests on the outer workpiece, after which the fastening element is twisted to lock.

15. The method as claimed in claim 14, in which, for connection to a workpiece perforated in the connecting region, the connecting element is pushed in axially until the connecting element head is in contact and is then twisted to lock.

16. The method as claimed in claim 14, in which, for connection to a workpiece unperforated in the connecting region, the connecting element is rotated under an axial contact pressure and with a high speed until a hole and, if appropriate,
   a rim is produced and is then pressed in axially, while reducing the speed, until the connecting element head is resting on the workpiece, and is then twisted to lock.

17. A connecting element for connecting at least two workpieces to one another, having
   a shank,
   a connecting element head at one end of the shank, said head projecting radially beyond the outside of the shank,
   a rotary driving formation on the connecting element head, and
   a front shank end, wherein
   at least one pair of closed annular projections is arranged on the shank in a holding portion of the shank which starts from the underside of the connecting element head, wherein
   at least one annular projection is not arranged fully in a plane extending perpendicularly to the longitundinal axis of the shank, and
   the spacing between the two annular projections of the pair differs along the circumference in which the front end of the shank is of tapering design and is designed as a ballistic, rounded, tip.

\* \* \* \* \*